(12) United States Patent
Arora

(10) Patent No.: US 6,708,179 B1
(45) Date of Patent: Mar. 16, 2004

(54) INCREMENTAL REFRESH OF MATERIALIZED VIEWS FOR MANY-TO-MANY RELATIONSHIPS

(75) Inventor: Nimar Arora, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 220 days.

(21) Appl. No.: 09/969,938

(22) Filed: Oct. 2, 2001

Related U.S. Application Data

(63) Continuation-in-part of application No. 09/968,568, filed on Sep. 28, 2001.

(51) Int. Cl.$^7$ .............................................. G06F 17/30
(52) U.S. Cl. ............................................. 707/102; 707/3
(58) Field of Search ................... 707/2, 3, 10, 102, 707/103 R, 201, 203

(56) References Cited

U.S. PATENT DOCUMENTS

| | | | |
|---|---|---|---|
| 6,272,502 B1 * | 8/2001 | Lieuwen et al. | 707/203 |
| 6,339,769 B1 * | 1/2002 | Cochrane et al. | 707/2 |
| 6,513,034 B1 * | 1/2003 | Leung et al. | 707/3 |
| 6,532,470 B1 * | 3/2003 | Cochrane et al. | 707/102 |
| 6,546,402 B1 * | 4/2003 | Beyer et al. | 707/201 |
| 6,591,266 B1 * | 7/2003 | Li et al. | 707/10 |

* cited by examiner

Primary Examiner—Diane D. Mizrahi
(74) Attorney, Agent, or Firm—Marcel K. Bingham; Hickman Palermo Truong & Becker LLP

(57) ABSTRACT

A framework for the incrementally refreshing a materialized view is provided. The materialized view is based on a query that references a projected table and another set of base tables. The query projects the columns of the projected table. To refresh the materialized view, a set of tuples is computed that identify rows to delete, insert, or otherwise modify in the materialized view in order to refresh it. The set of tuples is computed by computing a set of intersections, (1) one for the intersection between the query and the change log of the projected table, and (2) at least one other between the equijoin of the change log for one of the other base tables and the projected table. The query may define an equijoin between the projected table and at least one base table based on equijoin conditions that define a many-to-many relationship or a one-to-many relationship.

24 Claims, 4 Drawing Sheets

---

INCREMENTAL REFRESH OF A MATERIALIZED VIEW DEFINED BY A QUERY THAT

1. Projects columns of one relation,
2. Returns distinct tuples
3. Defines an distinct union of one or more equijoins

↓

Delete rows identified by the results of a subquery that generates $\Delta^-$, where
$$\Delta^- = \cup \, (\prod_{C_0}(R_{i1} \oplus R_{i2} \oplus \ldots \oplus \Delta^+_{ij})_{J_i} - Q)$$
$$i = 1\ldots n$$
$$j = 1\ldots l_i$$

310

↓

Insert rows identified by the results of a subquery that generates $\Delta^+$, where
$$\Delta^+ = \cup \, Q \cap \prod_{C_0}(R_{i1} \oplus R_{i2} \oplus \ldots \oplus \Delta^+_{ij})_{J_i}$$
$$i = 1\ldots n$$
$$j = 1\ldots l_i$$

320

FIG. 1 bookstore

| storenum | location |
|---|---|
| 1 | CA |
| 2 | FL |

120 /
121 —
122 — supplies

| storenum | schoolnum |
|---|---|
| 1 | 1 |
| 1 | 2 |
| 2 | 1 |
| 2 | 3 |

130 /
131 —
132 —
133 —
134 — school

| schoolnum |
|---|
| 1 |
| 2 |
| 3 |

140 /
141 —
142 —
143 —

INCREMENTAL REFRESH OF A MATERIALIZED VIEW
DEFINED BY A QUERY THAT

1. Projects columns of one relation,
2. Returns distinct tuples
3. Defines an distinct union of one or more equijoins Delete rows identified by the results of a
subquery that generates $\Delta^-$, where
$$\Delta^- = \cup\, (\Pi_{C_0}(R_{i1} \oplus R_{i2} \oplus \ldots \oplus \Delta^+_{ij})_{J_i} - Q)$$
$$i = 1 \ldots n$$
$$j = 1 \ldots l_i$$

310

Insert rows identified by the results of a subquery
that generates $\Delta^+$, where
$$\Delta^+ = \cup\, Q \cap \Pi_{C_0}(R_{i1} \oplus R_{i2} \oplus \ldots \oplus \Delta^+_{ij})_{J_i}$$
$$i = 1 \ldots n$$
$$j = 1 \ldots l_i$$

INCREMENTAL REFRESH OF MATERIALIZED VIEWS FOR MANY-TO-MANY RELATIONSHIPS

This patent application is a continuation-in-part of and claims priority from U.S. patent application Ser. No. 09/968,568, entitled "INCREMENTAL REFRESH OF MATERIALIZED VIEWS FOR MANY-TO-MANY RELATIONSHIPS", filed by Nimar Arora, on Sep. 28, 2001, the contents of which are herein incorporated by reference in its entirety.

FIELD OF THE INVENTION

The present invention relates to DBMSs, and in particular, to maintaining materialized views.

BACKGROUND OF THE INVENTION

In a database management system (DBMS), data is stored in one or more data containers, each container contains records, and the data within each record is organized into one or more fields. In relational DBMSs, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

In a DBMS used for "data warehousing" or "decision support", it is common for identical or closely related queries to be issued frequently. For example, a business may periodically generate reports that summarize the business facts stored in the database, such as: "What have been the best selling brands of soft drinks in each of our sales regions, during the past six months?".

To respond to such queries, the database server typically has to perform numerous join operations because the database records contain the information that is required to respond to the queries. When a DBMS contains very large amounts of data, certain queries against the database can take an unacceptably long time to execute. The cost of executing a query may be particularly significant when the query (which takes the form of a "SELECT" statement in the SQL database language) requires join operations among a large number of database tables.

MATERIALIZED VIEWS

Among commercial users of DBMSs, it has become a common practice to store the results of often-repeated queries in database tables or some other persistent database object. By storing the results of queries, the costly join operations required to generate the results do not have to be performed every time the queries are issued. Rather, the database server responds to the queries by simply retrieving the pre-computed data.

These stored results are commonly referred to as materialized views. The contents of a materialized view is defined by metadata referred to as a view definition. The view definition contains mappings to one or more columns in the one or more tables containing the data. Columns and tables that are mapped to a materialized view are referred to herein as base columns and base tables of the materialized view, respectively. The column and the base column mapped to the column are referred to as being the same field. The data maintained in the base columns is referred to herein as base data. The data contained in a materialized view is referred to herein as materialized data.

Typically, the view definition is in the form of a database query, herein referred to as a materialized view query. The materialized view query is computed and the results are stored as the materialized view. The results can be in the form of rows, which may be rows from a single base table or a rows created by joining rows in the base table. When a "base" row (or a subset of its columns) from a base table is included in the computed results of a materialized view query that are stored, the row is referred to as being included in the materialized view. The base table whose rows are included in the materialized view are referred to as the "projected" table. Likewise, when a "base" row (or a subset of its columns) from a base table is included in the computed results of a query, the row is said to be returned by the query. Furthermore, the columns that are included in the materialized view or the computed results in the query are referred to as being projected by the materialized view or query.

Materialized views eliminate the overhead associated with gathering and deriving the data every time a query is executed. Through a process known as query rewrite, a query can be optimized to recognize and use existing materialized views that could answer the query. Typically, the query rewrite optimization is transparent to the application submitting the query. That is, the rewrite operation happens automatically and does not require the application to know about the existence of materialized views, nor that a particular materialized view has been substituted for the original query.

REFRESHING MATERIALIZED VIEWS

As new data is periodically added to the base tables of a materialized view, the materialized view needs to be updated to reflect the new base data. When a materialized view accurately reflects all of the data currently in its base tables, the materialized view is considered to be "fresh". Otherwise, the materialized view is considered to be "stale". A stale materialized view may be recomputed by various techniques that are collectively referred to as a "refresh". A refresh may performed for a materialized view while modifications are concurrently being made to its base tables.

One approach to refreshing materialized views is referred to as the "total refresh" or "full refresh" approach. According to the total refresh approach, the values in materialized views are recalculated based on all of the base data every time new base data is supplied. Systems that employ the full refresh approach have the disadvantage that the re-creation process is a relatively lengthy operation due to the size and number of tables from which the materialized data is derived. For example, when ten new rows are added to a particular base table that contains a million rows, a total refresh operation would have to process all one million and ten rows of the base table to regenerate the materialized views derived using the base table.

The process of updating materialized data may be improved by performing incremental refresh, where rather than generating a new set of materialized data based on calculations that use all of the base data, the materialized data is updated based on modifications to the base data.

One type of conventional approach for incremental refresh, the concurrent refresh approach, refreshes the materialized view whenever the base tables of the materialized views are modified. A disadvantage for this approach is that it adds overhead to operations that modify the base tables. Furthermore, the overhead is incurred during periods of greatest activity for the base tables.

There are several reasons the concurrent refresh approach requires that the materialized view be refreshed whenever the base tables are changed. First, the concurrent refresh approach uses an algorithm that requires that the old values of the base table be available. Generally, these values are available if the materialized view is refreshed whenever the base table is modified. Second, the algorithm used may also require that the materialized view be refreshed based on the chronological order of changes. Refreshing the materialized view as changes are made to the base tables ensures that the materialized view is refreshed according to the chronological order of changes.

Other conventional incremental refresh approaches that can defer refresh of a materialized view may also depend on the availability of the old values of the base table and knowledge of the chronological order in which changes are made to a base table. Retaining this information can be very costly for a DBMS, or such information may simply not be available when the refresh is performed.

Furthermore, many types of materialized views cannot be incrementally refreshed by the conventional incremental refresh approaches. For example, there is no mechanism that incrementally refreshes a materialized view that defines a join operation that is based on a many-to-many relationship between the tables being joined, or that is based on a union of queries. To illustrate a materialized view that cannot be incrementally refreshed using conventional incremental refresh approaches, the following table definitions and materialized view superstore are provided.

```
create table bookstore (
    storenum number primary key,
    name varchar2(1000),
    location varchar2(1000));
create table school (
    schoolnum number primary key,
    population number);
create table supplies (
    storenum number,
    schoolnum number,
    primary key (storenum, schoolnum));
create table sale (
    saleid number primary key,
    storenum number,
    amount number,
    itemid number,
    saledate date);
```

The base tables are used by an application to model the sales between bookstores and schools. The application maintains the table supplies so that two of its columns hold primary key values for tables school and bookstore. Supplies.storenum contains primary key values from bookstore.storenum; supplies.schoolnum contains primary key values from school.schoolnum.

The columns of tables and the values in the column may be used to establish a relationship between tables and between the rows in the tables. A row in one table and a row in another table are related if one or more of their columns satisfy a "relational" condition, typically based on equality. For example, a row in bookstore is related to a row in supplies if, for these rows, the columns bookstore.storenum and supplies.storenum are both equal to one.

A table has a one-to-one relationship with another table when one row in the table can only be related to one row in the other table. A table has a one-to-many relationship with another table when a row in the table can be related to multiple rows in the other table. A table has a many-to-many relationship with another table when multiple rows in the table may be related to multiple rows in the other table.

A third table may be used to establish a many-to-many relationship between tables. The relational conditions defining the relationship are based on columns in the three tables. Column values in a row of the third table establish relationships between rows of one table and rows of another table. To illustrate a many-to-many relationship, FIG. 1 is provided. FIG. 1 shows table-of-values 101, which depict illustrative values for tables bookstore, supplies, and school. Values for all columns are not shown.

Row 121 is related to multiple rows in school, i.e. row 141 and 142, for the following reason. Row 121 of bookstore is related to row 131 and 132 in supplies because for rows 131 and 132, the value in supplies.storenum is equal to '1', which is the value of bookstore.storenum of row 121. Row 131 is related to row 141 of school.schoolnum because for row 131 the value in supplies.schoolnum is equal to '1', which is equal to the value in school.schoolnum of row 141. Row 132 is related to row 142 of school.schoolnum because for row 132 the value in supplies.schoolnum is equal to '2', which is equal to the value in school.schoolnum of row 142. Because rows 131 and 132 are related to row 121 in bookstore and rows 141 and 142, rows 131 and 132 establish a relationship between a row in bookstore and multiple rows in school.

Likewise, row 141 in school is related to rows 131 and 133 in supplies. Row 131 is related to row 121 in bookstore and row 133 is related to row 122 in bookstore. Because rows 131 and 133 are related to row 141 in school and to rows 121 and 122 in bookstore, rows 131 and 133 establish a relationship between a row in school and multiple rows in bookstore. Thus a many-to-many relationship exists between bookstore and school because multiple rows in bookstore may be related to multiple rows in school and vice versa. Thus supplies establishes a many-to-many relationship between bookstore and school.

ILLUSTRATIVE MATERIALIZED VIEW DEFINITION

Materialized view superstore is defined by database command QCM as follows.

```
create materialized view superstore refresh fast as
    select * from bookstore where exists
        (select 1 from supplies where supplies.storenum =
        bookstore.storenum and exists
        (select 1 from school where school.population > 1000 and
        school.schoolnum = supplies.schoolnum))
    union
    select * from bookstore where exists
        (select 1 from sale where sale.storenum = bookstore.storenum and
        sale.amount > 10000)
```

QCM specifies a union between two queries, referenced here as QCM1 and QCM2, both of which return rows from bookstore to include in superstore. Query QCM1 specifies a join operation between table bookstore, supplies, and school based on the following join conditions: school.schoolnum= supplies.schoolnum and supplies.storenum= bookstore.storenum. These join conditions are the same as relational conditions upon which the many-to-many relationship discussed above is based.

Conventional incremental refresh mechanisms are capable of incrementally refreshing materialized views whose materialized view query is based on a many-to-one relationship, where a projected table is joined to a base table along a many-to-one relationship. Conventional incremental refresh mechanisms cannot, however, incrementally refresh materialized views whose materialized view query specifies a join between a projected table and another table along a one-to-many or a many-to-many relationship. One reason for this lack of support by conventional incremental refresh mechanisms is that whether a row from a projected base table is included in a materialized view may depend on multiple rows from another base table. Thus, when a change to row in the other base table affects a row from the projected table in the materialized view, it cannot be assumed that no other rows in the base table affect the row's inclusion in the materialized view.

Conventional incremental refresh approaches may also not support materialized queries that include rows from the unions of subqueries. A reason for this lack of support is that whether a row from a projected table is included in a materialized view may depend on multiple subqueries in the union of subqueries.

Based on the foregoing, it is clearly desirable to provide a system that incrementally refreshes a materialized view based on materialized view queries that include rows from the unions of subqueries or that specify a join between a projected table and another table along a one-to-many or a many-to-many relationship.

SUMMARY OF THE INVENTION

A framework for the incrementally refreshing a materialized view is provided. According to an aspect of the present invention, the materialized view is based on a query that references a projected table and another set of base tables. The query projects the columns of the projected table. To refresh the materialized view, a set of tuples is computed that identify rows to delete, insert, or otherwise modify in the materialized view in order to refresh it. The set of tuples is computed by computing a set of intersections, (1) one for the intersection between the query and the change log of the projected table, and (2) at least one other between the equijoin of the change log for one of the other base tables and the projected table. The query may define an equijoin between the projected table and at least one base table based on equijoin conditions that define a many-to-many relationship or a one-to-many relationship.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram depicting tables used to illustrate an embodiment of the present invention;

FIG. 3 is a flow chart depicting a process for refreshing a materialized view according to an embodiment of the present invention.

DETAILED DESCRIPTION OF THE INVENTION

Figure 2:
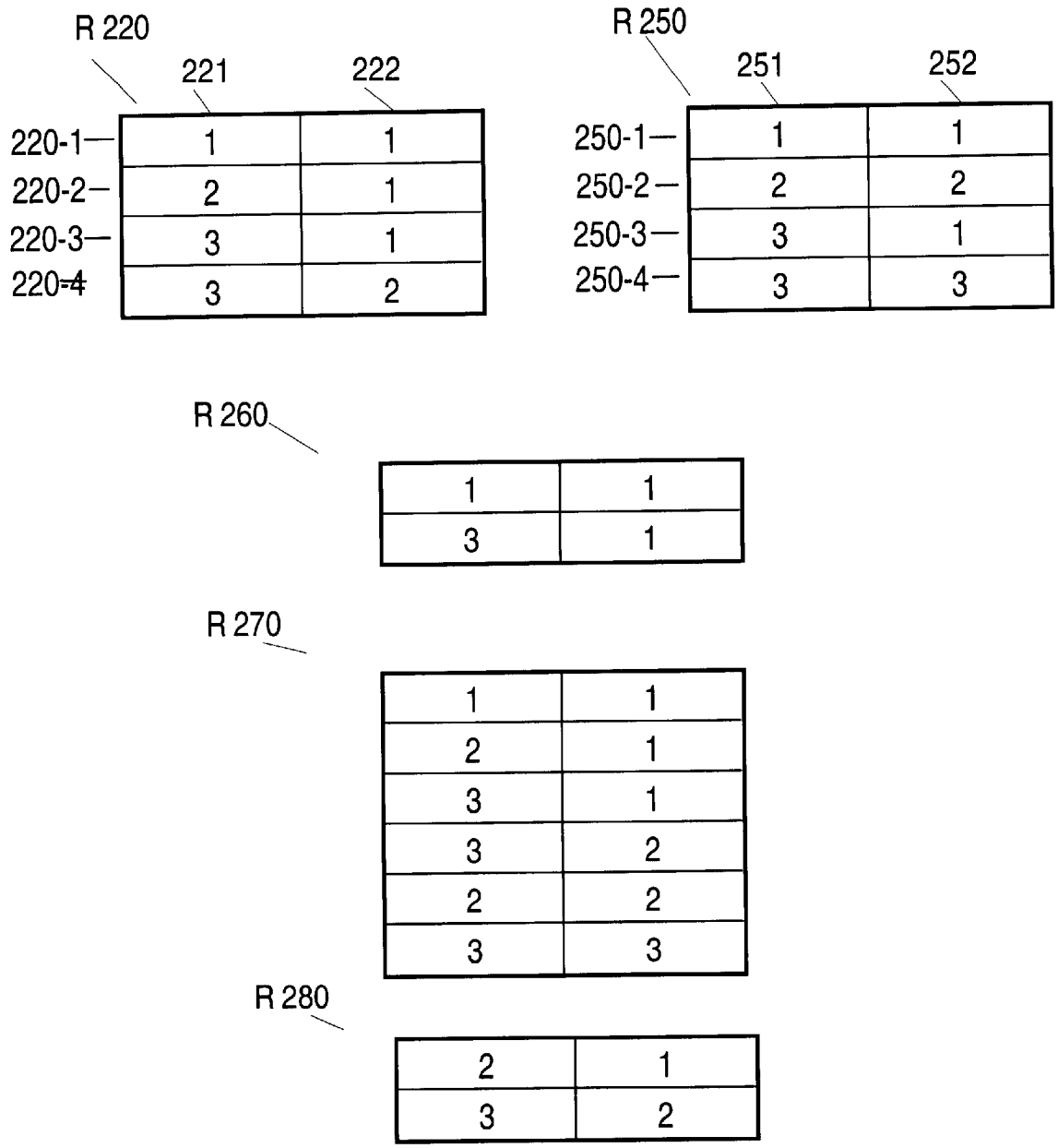
FIG. 2 is a block diagram depicting tables used to illustrate algebraic definitions according to an embodiment of the present invention.

A method and apparatus for incrementally refreshing materialized views is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

A materialized view is usually created by a DBMS in response to receiving a data definition language ("DDL") database command defining the materialized view. Typically, the DDL command specifies the materialized view query. The query is parsed and analyzed to determine whether the materialized view definition is valid. If valid, the DBMS creates the materialized view. The creation process involves generating the metadata that defines the materialized view.

Another part of the creation process is the generation of refresh code. Refresh code is executed to refresh a materialized view. Refresh code may consist of database commands that specify operations for loading data from the base tables and for modifying the materialized view. Typically, these database commands contain queries and subqueries that return results that identify rows to insert, delete, or update in a materialized view. Once the refresh code is generated, it is stored in the database metadata where it is accessed by the database process that refreshes the materialized views.

There are two types of refresh code: (1) full refresh code, which specifies operations for a full refresh, and (2) incremental refresh code, which specifies operations for an incremental refresh. Generally, full refresh code is generated for all materialized views, even those that are incrementally refreshed, to subsequently refresh the materialized view when it is not or can not be incrementally refreshed. Incremental refresh code typically consists of delete, insert, update, and upsert commands that operate on upon the results of subqueries that return rows identifying rows to delete, insert, or update.

Incremental refresh code is generated for a materialized view when (1) the DDL command issued to define the materialized view requests so, and (2) the materialized view satisfies incremental refresh criteria. Not all types of materialized views can be incrementally refreshed; the refresh criteria separates those that can be from those that cannot.

Described herein are incremental refresh techniques that allow the incremental refreshing of new classes of materialized views which could not be incrementally refreshed using conventional refresh mechanisms. Accordingly, the incremental refresh techniques affect the application of incremental refresh criteria and the generation of refresh code.

A framework for the incremental refresh techniques is described using two general purpose relational algebraic tautologies. Each tautology defines, at a general level, a formula that captures the changes in the base tables since the materialized view was last refreshed. These formuli are collectively referred to herein as the solution. One tautology describes the inserts that may be used to incrementally refresh a materialized view; the other formula describes the deletes that may be used to incrementally refresh a materialized view. Those skilled in the art will recognize that these formuli can be directly mapped to database commands implemented in refresh code which can be efficiently executed, that is, without full table scans on the base tables and only a single scan of a change log for each occurrence of a base table.

Change logs are sets of records (e.g. a table) that records changes to base tables. The change logs should have sufficient information to determine changes made to a base table since the last refresh. The chronological order of those changes are not needed by the incremental refresh techniques.

In an embodiment of the present invention, change logs may have the same shape as the base table, i.e. column definitions. Two change logs may be used to record changes to a base table, one to record inserts, the other to record deletes. For updates to a row in a base table, a record recording the old values may be inserted into the log for recording deletes, a record recording the new values may be inserted into the log for recording inserts.

Other embodiments may use a different form of change logs. For example, only one change log may be used for a base table to record changes to the base table. The change log contains records that indicate whether the records are recording an insert, delete, or update. For updates, only the changed values are recorded.

The incremental refresh techniques allow generation of refresh code that include queries that may operate under various constraints. Typically, the queries may only rely upon the latest values of the base tables and their change logs to refresh the materialized view. The materialized view values themselves are not used. In addition, the change logs may contain more but not less than the changes since the previous refresh. Before delving into relational algebra, a description of the following notations and definitions are introduced.

$$\prod_{\{storenum, name, location\}} (bookstore \oplus supplies \oplus \sigma_{\{school.population>1000\}}$$

$$(school)_{\{supplies.storenum=bookstore.storenum \text{ and } supplies.schoolnum=school.schoolnum\}}$$

$$\cup$$

$$\prod_{\{storenum, name, location\}} (bookstore \oplus \sigma_{\{sale.amount>10000\}} (sales))_{\{sales.storenum=bookstore.storenum\}}$$

ALGEBRAIC NOTATION AND DEFINITIONS

Tuple

A tuple is an ordered sequence of named attribute values. A row in a table is an example of a tuple. The columns of the row correspond to attributes.

Relation

A relation is a set of tuples with the same attributes. A table is an example of a relation. The rows returned by a query is another example of a relation.

FIG. 2 shows relations R 220 and R 250, which are used to illustrate definitions that follow. Relation RV 220 has attributes 221 and 222 and includes four tuples 220-1 through 220-4; Relation R 250 has attributes 251 and 252 and includes four tuples 250-1 through 250-4.

Set Operators $R_1 \cap R_2$ is the intersection of the relations $R_1$ and $R_2$. An intersection is the set of tuples that exist in both $R_1$ and $R_2$. R 260 is the intersection of R 220 and R 250. R 260 contains tuples that correspond to 220-1, 220-3, 250-1, and 250-3.

$R_1 \cup R_2$ is a union of the relations $R_1$ and $R_2$ with duplicates eliminated. Such a union is referred to herein as a distinct union. R 270 is a distinct union between R 220 and R 250. It contains all tuples that are either in R 220 or R 250.

$R_1 - R_2$ is the difference of the relations $R_1$ and $R_2$. The difference between $R_1$ and $R_2$ are the tuples in $R_1$ that not in the intersection between $R_1$ and $R_2$. R 280 is the difference between R 220 and R 250. It includes tuples that are in R 220 that are not in R 260.

Equijoin Operator $(R_1 \oplus R_2 \oplus \ldots \oplus R_n)$ is an equijoin of relations $R_1, R_2, \ldots, R_n$ with equijoin conditions specified in J. All the conditions in J are and'ed together. An equijoin between one or more relations is a set of tuples, where each tuple in the set is a combination of one tuple from one relation with a tuple from another relation, where the pair of tuples satisfy a join condition. The join condition is that a column value in one of the tuples is equal to a column value in the other tuple. The equijoin defined by QCM1 is as follows.

$$(bookstore \oplus supplies)_{\{supplies.storenum=bookstore.storenum\}}$$

$(R_1 \oplus R_2 \oplus \ldots \oplus R_n)_K$ for $1<i<n$ is an equijoin of fewer relations using K. K is the subset of the join conditions in J which apply to relations $R_1, R_2, \ldots, R_i$.

σ—Selection Operator $\sigma_s(R)$ is a subset of the relation R which satisfy the conditions in S.

Π Projection Operator $\Pi_C(R)$ is a relation with only the subset C of columns in R with duplicates eliminated.

To illustrate the notation described above, the following expression EX is provided. EX represents the subquery QCM, which defines subqueries QCM1 and QCM2. These were defined in the subsection ILLUSTRATIVE MATERIALIZED VIEW DEFINITION of the BACKGROUND section

INCREMENTAL REFRESH CRITERIA

The incremental refresh techniques can be used to incrementally refresh a materialized view query $Q_{mv}$ that has the general form specified by formula F.

$$Q_{mv} = \Pi_{C_0}(R_{11} \oplus R_{12} \oplus \ldots \oplus R_{1l_1})_{J_1} \cup \ldots \cup \Pi_{C_0}(R_{n1} \oplus R_{n2} \oplus R_{n3} \oplus R_{nl_i})$$

where:

n is the number of unioned subqueries in $Q_{mv}$, $l_i$ is the number of relations in the $n^{th}$ unioned subquery of $Q_{mv}$, $R_{ij}$ is the $j^{th}$ relation in the $i^{th}$ unioned subquery, $R_{ij}$ is $\sigma(T_{ij})_{Sij}$ ($S_{ij}$ being a filter condition), and the relations $T_{ij}$ are base tables.

Furthermore, $T_{j1}$ is the same table $T_0$ for all n distinct unions; $T_0$ is referred to as the outer table. The other base tables are referred to as inner tables. $C_0$ must also be a subset of columns of $T_0$.

Application of the criteria may be illustrated with reference to QCM. QCM is a distinct union of subqueries, defined by QCM1 and QCM2. Therefore, n=2. The following table A specifies other values that apply to query QCM under formula F.

TABLE A

| | |
|---|---|
| i = 1 | $l_1$ = 3 (i.e. bookstore, supplies, school) |
| (i.e. QCM1) | $R_{11}$ corresponds to bookstore |
| | $R_{12}$ corresponds to $\sigma(school)_{\{school.population > 1000\}}$ |
| | $R_{13}$ corresponds to supplies |
| | $C_0$ corresponds to storenum, name, & location in bookstore |
| i = 2 | $l_2$ = 2 |
| (i.e. QCM2) | $R_{21}$ corresponds to bookstore |
| | $R_{22}$ corresponds to $\sigma(sales)_{\{sales.amount > 10000\}}$ |
| | $C_0$ corresponds to storenum, name, & location in bookstore |

QCM1 and QCM2 are unioned subqueries that (1) define an equijoin between the base tables, (2) project the same columns from the same table, i.e. the outer table bookstore, and (3) return tuples with no duplicates. Therefore, query QCM satisfies the incremental refresh criteria.

The incremental refresh criteria for the incremental refresh techniques can be summarized as follows. The materialized view query must define distinct unions between subqueries that define an equijoin between base tables, each unioned subquery projecting the same columns from the same outer table.

CONSTRAINTS FOR $\Delta^+$ and $\Delta^-$

The solution describes a formula for generating tuples that identify a tuple to insert. These tuples are referred to as $\Delta^+$. The solution also describes a formula for generating tuples that identify a tuple to delete. These tuples are referred to as $\Delta^-$. $\Delta^+$ are $\Delta^-$ are defined as follows.

| | | |
|---|---|---|
| I. | $\Delta^+ \supseteq Q - Q'$ | $\Delta^+$ is a superset of tuples that includes at least the difference between Q and Q'. Q' is the value of $Q_{mv}$ at time t. Thus, $\Delta^+$ contains a superset of the tuples added to the materialized view since time t. |
| II. | $\Delta^+ \subseteq Q$ | $\Delta^+$ is a subset of the tuples in Q. Thus, every tuple in $\Delta^+$ is in Q, the current value of the materialized view. |
| III. | $\Delta^- \supseteq Q' - Q$ | $\Delta^-$ is a superset of the difference between Q' - Q. Thus $\Delta^-$ is a superset of the tuples deleted from the materialized view since time t. |
| IV. | $\Delta^- \cap Q$ = NILL | There is no tuple in $\Delta^-$ that is in the current value of the materialized view at time t. |

The formula for calculating $\Delta^+$ and $\Delta^-$ are based on information available in change logs and the current value of the base tables. Thus, the following are given:

| | | |
|---|---|---|
| 1. | $R_{ij}$ | The current value of a relation. R'ij is the value at a previous time t. |
| 2. | $\Delta^+_{ij}$, where: | $\Delta^+_{ij}$ is a superset of the tuples that have been |
| | $\Delta^+_{ij} \supseteq$ Rij - R'ij | inserted into $R_{ij}$ after time t. $\Delta^+_{ij}$ may be computed from change logs. $\Delta^+_{ij}$ may include more inserted rows than were actually inserted since time t. Note the definition of $\Delta^+_{ij}$ does not require the chronological order of the inserts. |
| 3. | $\Delta^-_{ij}$, where: | $\Delta^-_{ij}$ is a superset of the tuples deleted from R'ij from |
| | $\Delta^-_{ij} \supseteq$ R'ij - Rijtime t. | $\Delta^-_{ij}$ may be may be computed from the materialized view logs. $\Delta^-_{ij}$ may include more deleted rows than were actually deleted since time t. Note the definition of $\Delta^-_{ij}$ does not require the chronological order of the deletes. |

INCREMENTAL REFRESH SOLUTION

The following are the formuli for the solution.

$$\Delta^+ = \bigcup Q \bigcap \prod c_0(R_{i1} \oplus R_{i2} \oplus \ldots \oplus \Delta^+_{ij}) J_i$$
$$i = 1 \ldots n$$
$$j = 1 \ldots l_i$$

$$\Delta^- = \bigcup (\Pi c_0(R_{i1} \oplus R_{i2} \oplus \ldots \oplus \Delta^-_{ij}) J_i - Q)$$
$$i = 1 \ldots n$$
$$j = 1 \ldots l_i$$

It should be noted that even though the formula references the values Q, the formula and its reference to Q may be mapped to queries and subqueries in the refresh code.

As mentioned before, $Q_{mv}$ defines n unioned subqueries, each of the n subqueries defining an equijoin between $l_i$ relations. As shown above, $\Delta^+$ may be computed as a distinct union of a set of intersections, the set including a subset of intersections for each $i^{th}$ unioned subquery. For each $i^{th}$ unioned subquery, (1) an intersection is computed between Q and the $\Delta^+_{i0}$ of the outer table, and (2) an intersection is computed for each given inner table of the $i^{th}$ subquery, the intersection being the intersection between Q and an equijoin between a subset of the $l_i$ relations and $\Delta^+_{ij}$ of the given inner table. The subset of $l_i$ relations is composed of the relation for the outer table and the relations 2 to (j–1). Thus, the computation of $\Delta^+$ includes a computation of a join between a $\Delta^+_{ij}$ for each base table and Q and/or other base tables.

$\Delta^-$ may be computed as a distinct union of a set of differences, the set including a subset of differences for each $i^{th}$ unioned subquery. For each $i^{th}$ unioned subquery, (1) a difference is computed between Q and the $\Delta^-_{i0}$ of the outer table, and (2) a difference is computed for each given inner table of the $i^{th}$ subquery, the difference being the difference between Q and the equijoin between a subset of the $l_i$ relations and $\Delta^-_{ij}$ of the given inner table. The subset of $l_i$ relations is composed of the relation for the outer table and the relations 2 to (j–1). Thus, the computation of $\Delta^-$ includes a computation of a join between $\Delta^-_{ij}$ for each base table and Q and/or other base tables.

ILLUSTRATIVE COMPUTATIONS

The computation of $\Delta^+$ and $\Delta^-$ may be illustrated using the query QMVE.

```
select * from bookstore where exists
    (select 1 from supplies where supplies.storenum =
        bookstore.storenum)
```

QMVE may be represented by the expression ARQ as follows.

$$\Pi_{\{storenum,\ name,\ location\}}(bookstore \oplus supplies)_{\{supplies.storenum=bookstore.storenum\}}$$

The application of the solution yields the following expression ARP for computing $\Delta^+$.

$$\Delta^+ = \left(Q \cap \prod_{\{storenum,name,location\}} (\Delta^+_{bookstore})\right) \cup$$

$$\left(Q \cap \prod_{\{storenum,name,location\}} (bookstore \oplus \Delta^+_{supplies})_{\{supplies.storenum=bookstore.storenum\}}\right)$$

QMVE specifies one unioned subquery that defines an equijoin operation between bookstore and supplies, so n=1 and $l_i$=2. Accordingly, ARQ represents a distinct union of two intersections: one between Q and a projection of an equijoin between bookstore and $\Delta^+_{supplies}$; the other between Q and $\Delta^+_{bookstore}$.

The application of the solution yields the following expression ARM for computing $\Delta^-$.

$$\Delta^- = \left(\prod_{\{storenum,name,location\}} (\Delta^-_{bookstore}) - Q\right) \cup$$

$$\left(\prod_{\{storenum,name,location\}} (bookstore \oplus \Delta^-_{supplies})_{\{supplies.storenum=bookstore.storenum\}} - Q\right)$$

ARM is a distinct union of two intersections: one between Q and a projection of an equijoin between bookstore and $\Delta^-_{supplies}$; the other intersection being an intersection between Q and $\Delta^-_{bookstore}$.

The table values shown in FIG. 1 are used to further illustrate the computation $\Delta^+$ and $\Delta^-$, and how the computation may be used to identify tuples needed to refresh a materialized view. The values of tuples are described using the following notation format $(c_1, c_2)$, where, for bookstore and Q or Q', c1=storenum and c2=location, and for supplies, $c_1$=storenum and $c_2$=schoolnum. Other columns are not illustrated because they are not necessary for the illustration. The following is an example of a row where bookstore.storenum=1, bookstore.location='CA'.

(1, CA)

A set of tuples is represented as follows:

{(1, CA), (2, FL))}

In addition, a join of a row in bookstore and supplies is represented according to the notation format (bookstore.storenum, bookstore.location, supplies.storenum, supplies.schoolnum). Thus, the result of an equijoin operation between row 122 and row 133 is represented as follows.

(2, FL, 2,1)

In the illustration, rows 133 and 134 are deleted. Thus, $\Delta^-_{supplies}$={(2,1),(2,3)}, and Q=(1, CA). $\Delta^-$ is computed as follows:

$$\Delta^- = \prod_{\{storenum,\ldots,location\}} (bookstore \oplus \Delta^-_{supplies}) - Q$$

$$= \prod_{\{storenum,\ldots,location\}} (\{(1, CA), (2, FL)\} \oplus \{(2, 1), (2, 3)\}) - (1, CA)$$

$$= \prod_{\{storenum,\ldots,location\}} \{(2, FL, 2, 1), (2, FL, 2, 3)\} - (1, CA)$$

$$= (2, FL) - (1, CA)$$

$$= (2, FL)$$

$\Delta^-$ identifies (2, FL) as a row to delete from Q' in order to incrementally refresh the materialized view. The join conditions supplies.storenum=bookstore.storenum have been omitted from the above expression and other following expressions for purposes of exposition.

In the illustration, assume that only row 133 is deleted. Thus, $\Delta^-_{storenum}$=(2,1), and Q={(1, CA), (2, FL)}. $\Delta$ is computed as follows:

$$\Delta^- = \prod_{\{storenum,\ldots,location\}} (bookstore \oplus \Delta^-_{storenum}) - Q$$

$$= \prod_{\{storenum,\ldots,location\}} (\{(1, CA), (2, FL)\} \oplus (2, 1)) - \{(1, CA), (2, FL)\}$$

$$= \prod_{\{storenum,\ldots,location\}} ((2, FL, 2, 1)) - \{(1, CA), (2, FL)\}$$

$$= (2, FL) - \{(1, CA), (2, FL)\}$$

$$= NILL$$

$\Delta$ identifies no rows to delete from Q' in order to incrementally refresh the materialized view. The above illustration demonstrates how the projection of the equijoin between $\Delta^-_{storenum}$ and the current value of bookstore generates a list of "potential" tuples identified for deletion, i.e.

(2, FL), and how computing the difference between Q and the list of "potential" tuples may eliminates tuples from this list of potential tuples.

Changes to base tables may not only contain inserts and deletes, but updates. As mentioned before, updates created in the change log correspond to log records representing a delete of the old values and an insert of the new values. The following examples illustrate how $\Delta^+$ and $\Delta^-$ are computed when base tables are updated. Assume row 122 is updated from (2, FL) to (2, PA). Thus, $\Delta^-_{bookstore}=(2,FL)$, $\Delta^+=(2, PA)$, and $Q=\{(1, CA), (2, \text{'PA'})\}$. $\Delta^-$ and $\Delta^+$ are computed as follows:

$$\Delta^- = \prod_{\{storenum,\ldots,location\}} (\Delta^-_{bookstore}) - Q$$

$$= \prod_{\{storenum,\ldots,location\}} ((2, FL)) - \{(1, CA), (2, PA)\}$$

$$= ((2, FL)) - \{(1, CA), (2, PA)\}$$

$$= (2, FL)$$

$$\Delta^+ = Q \cap \prod_{\{storenum,\ldots,location\}} (\Delta^+_{bookstore})$$

$$= \{(1, CA), (2, PA)\} \cap \prod_{\{storenum,\ldots,location\}} ((2, PA))$$

$$= \{(1, CA), (2, PA)\} \cap ((2, PA))$$

$$= ((2, PA))$$

The next example illustrates computation of $\Delta^+$ and $\Delta^-$ when a row is inserted into the outer table that does not join with any row in an inner table, and when later a row is inserted into the inner table that does join with the row inserted into the outer table.

For purposes of illustration, row (3, TX) is added to bookstore. Therefore, $\Delta^+_{bookstore}=(3, TX)$, and bookstore=$\{(1, CA), (2, FL), (3, TX)\}$, and $Q=\{(1, CA), (2, FL)\}$. $\Delta^-$ computed as follows:

$$\Delta^+ = Q \cap \prod_{\{storenum,\ldots,location\}} (\Delta^+_{bookstore})$$

$$= \{(1, CA), (2, FL)\} \cap \prod_{\{storenum,\ldots,location\}} ((3, TX))$$

$$= \{(1, CA), (2, FL)\} \cap ((3, TX))$$

$$= NILL$$

Even though row (3, TX) is in $\Delta^+_{bookstore}$, the application of the formula for $\Delta^+$ precludes the row's inclusion in $\Delta^+$ and its insertion into the materialized view. Next, (3,2) is inserted into supplies. Therefore, $\Delta^+_{supplies}=(3,2)$, bookstore=$\{(1, CA), (2, FL), (3, TX)\}$, and $Q=\{(1, CA), (2, FL), (3, TX)\}$. $\Delta^+$ is computed as follows:

$$\Delta^+ = Q \cap \prod_{\{storenum,\ldots,location\}} (bookstore \oplus \Delta^+_{supplies})$$

$$= \{(1, CA), (2, FL), (3, TX)\} \cap \prod_{\{storenum,\ldots,location\}}$$

$$(\{(1, CA), (2, FL), (3, TX)\} \oplus (3, 2))$$

$$= \{(1, CA), (2, FL), (3, TX)\} \cap \prod_{\{storenum,\ldots,location\}} ((3, TX, 3, 2))$$

-continued $$= \{(1, CA), (2, FL), (3, TX)\} \cap (3, TX)$$

$$= (3, TX)$$

IMPLEMENTATION AND OPTIMIZATION

Refresh code is generated to be later executed to delete, insert, or update tuples that are identified by $\Delta^+$ and $\Delta^-$. In general, the refresh code includes a database command that inserts rows and a database command that deletes rows. The database commands that insert rows insert rows returned by subqueries that identify the rows in $\Delta^+$. The subqueries specify equijoin conditions and other select conditions needed to produce $\Delta^+$. Some of the subqueries may also return rows representing the intersection between $Q_{mv}$ and the base tables or equijoins. An intersection between a query and a relation is data in a relation that satisfies the query. An intersection between a query and another query is the resultant tuples of the query that satisfy the other query.

The database commands that delete rows delete rows returned by subqueries that identify the rows in $\Delta^-$. The subqueries specify equijoin conditions and other select conditions needed to produce $\Delta^-$. Some of the subqueries may also return rows representing the difference between $Q_{mv}$ and the base tables or equijoins. A difference between a relation and a query is data in the relation that does not satisfy the query. An intersection between a query and another query is the resultant tuples of the query that do not satisfy the other query.

FIG. 3 is a flow chart depicting an overview of a process that may be followed by a DBMS to incrementally refresh a materialized view. The process may be implemented through refresh code generated for a materialized view. Referring to FIG. 3, at step 310, the DBMS deletes rows identified by the results of a subquery that generates $\Delta^-$. At step 320, the DBMS inserts rows identified by the results of a subquery that generates $\Delta^+$.

To further optimize execution of the refresh code, a variety of measures may be used. First, a primary key can be included in one of the projected columns of the outer table. Some types of logs indicate whether a particular field has changed. If a change log indicates that a primary key has not changed for a row included in the materialized view, then a row in the materialized view need only be updated with the new values. The overhead of performing both an insert and a delete can be avoided in this way. Second, the join columns should be indexed.

PROOF

The following is a proof showing that the solution properly computes $\Delta^+$ and $\Delta^-$. The constraints for $\Delta^+$ and $\Delta^-$ and the solution are reproduced below.

I. $\Delta+ \supseteq Q-Q'$
II. $\Delta+ \subseteq Q$
III. $\Delta^- \supseteq Q'-Q$
IV. $\Delta^- \cap Q = NILL$ It is asserted that:

$$\Delta^+ = \bigcup_{i=1\ldots n} Q \cap \prod c_0(R_{i1} \oplus R_{i2} \oplus \ldots \oplus \Delta^+_{ij})J_i$$

$$j = 1 \ldots l_i$$

-continued $$\Delta^- = \bigcup (\Pi c_0(R_{i1} \oplus R_{i2} \oplus ... \oplus \Delta_{ij}^-) J_i - Q)$$
$$i = 1 ... n$$
$$j = 1 ... l_i$$

Clearly, constraints II and IV are trivial to prove.

As for I, consider any row r in Q–Q'. Since it belongs to Q it must exist in at least one of the terms in the union of Q, say the $i^{th}$ term. In other words, r is constructed by the join of rows $r_{i1}$ from $R_{i1}$, $r_{i2}$ from $R_{i2}$, ..., $r_{il_i}$ from $R_{il_i}$. Since r is not in Q' there must be some j such that $r_{ij}$ is not in $R_{ij}'$. In other words, $r_{ij}$ is in $\Delta^+_{ij}$ and hence r is in $\Delta^+$ since it is in the union-ed query resulting from these values of i and j.

As for III, consider any row r' in Q'–Q, say it belongs to the $i^{th}$ term of Q'. In other words, r is constructed by the join of rows $r_{i1}'$ from $R_{i1}'$, $r_{i2}'$ from $R_{i2}'$, ..., $r_{il_i}'$ from $R_{il_i}'$. Since r' is not in Q there most be some j such that $r_{ij}'$ is not in $R_{ij}$. Thus, $r_{ij}'$ is in $\Delta^-_{ij}$. If we consider the term in $\Delta^-_{ij}$ contributed by the smallest such j it follows that r' is in $\Delta^-_{ij}$.

HARDWARE OVERVIEW

Figure 4:
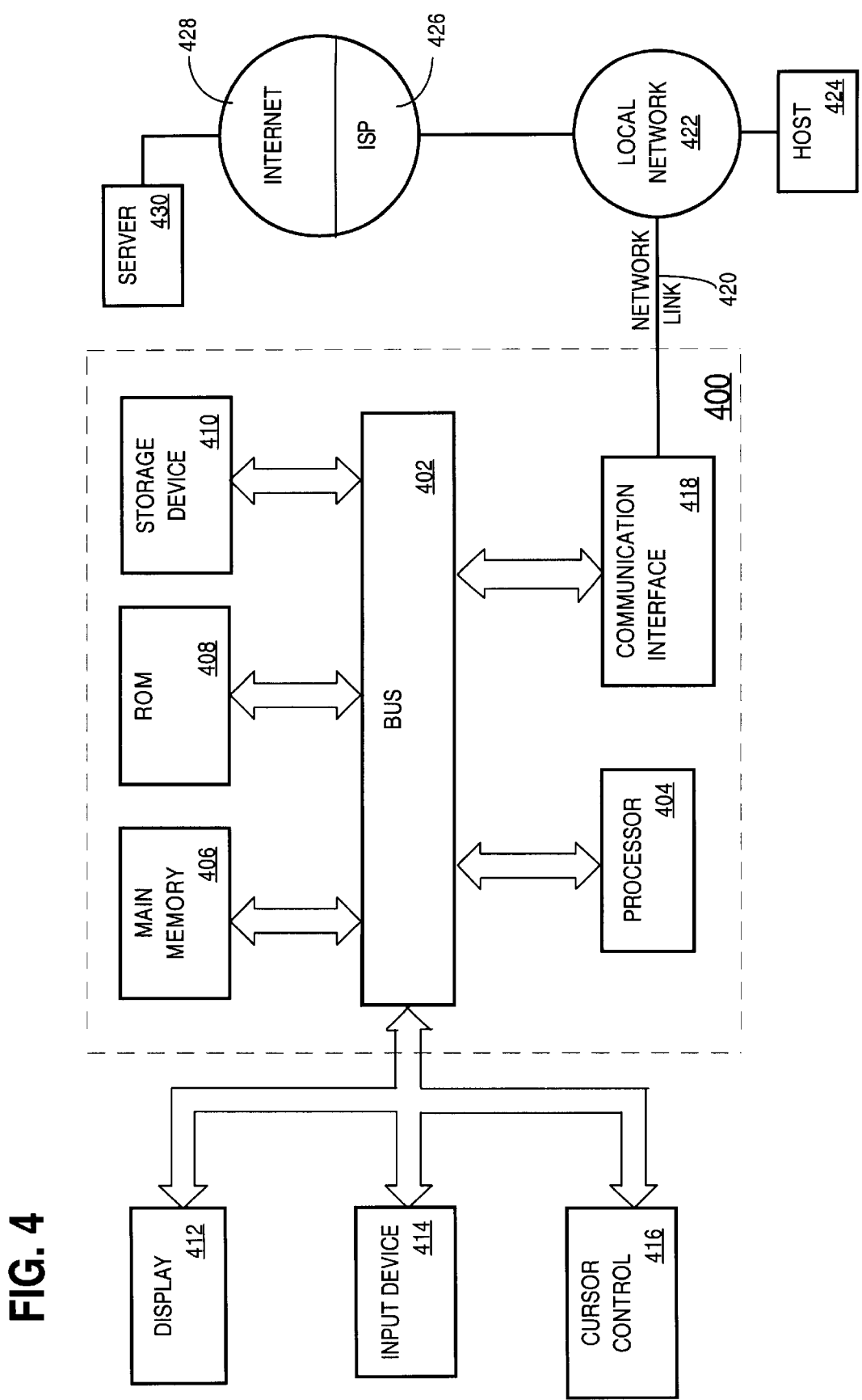
FIG. 4 is a block diagram of a computer system upon which an embodiment of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for incrementing materialized views. According to one embodiment of the invention, incrementing materialized views as provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for incrementally refreshing materialized views as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for incrementally refreshing a materialized view, the method comprising the steps of:
    computing a first set of tuples that identify a first set of changes to apply to a materialized view to incrementally refresh the materialized view;
    wherein the materialized view is defined by a query that references a first base table and one or more other tables that include a second base table;
    wherein the materialized view projects one or more columns of the first base table;
    wherein the step of computing a first set of tuples includes computing a first union between
        an intersection between the query and a first change log that indicates changes to said first base table, and
        an intersection between the query and a first equijoin based on the first base table and a second change log that indicates changes to said second base table.

2. The method of claim 1, wherein the step of computing a first union includes computing a first union based on an intersection between the query and a second equijoin based on the first base table, the second base table, and a third change log that indicates changes to a third base table from said one or more other tables.

3. The method of claim 1,
    wherein the first set of tuples identifies tuples to insert into said materialized view;
    wherein the method further includes computing a second set of tuples that identifies tuples to delete from said materialized view;
    wherein the step of computing a second set of tuples includes computing a second union between
        a difference between the query and a third change log that indicates deletions to said first base table, and
        a difference between the query and a third equijoin based on the first base table, and a fourth change log base table that indicates deletions to said second base table.

4. The method of claim 1, wherein the query specifies equijoin conditions that define a many-to-one relationship between the first base table and the second base table.

5. The method of claim 1, wherein the query specifies equijoin conditions that define a many-to-many relationship between the first base table and the second base table.

6. The method of claim 1, wherein the materialized view projects only columns from said first base table.

7. The method of claim 1, wherein the query returns only tuples with no duplicate tuples.

8. A method of incrementally refreshing a materialized query, the method comprising the steps of:
    storing a materialized view, wherein said materialized view is defined by a query that:
        references a first base table and a second base table,
        defines an equijoin between said first base table and said second base table based on equijoin conditions that define either a one-to-many relationship or a many-to-many relationship between said first base table and said second base table, and
    incrementally refreshing said materialized view based on a first change log and a second change log, wherein said first change log indicates changes to said first base table and said second change log indicates changes to said second base table.

9. The method of claim 8, wherein said query projects columns from only said first base table.

10. The method of claim 9, wherein said query returns only tuples with no duplicate tuples.

11. A method of incrementally refreshing a materialized query, the method comprising the steps of:
    storing a materialized view, wherein said materialized view is defined by a query that defines a union between:
        a first equijoin between a first base table and a second base table, and
        a second equijoin between said first base table and another table;
        wherein said materialized view projects one or more columns of said first base table; and
    incrementally refreshing said materialized view based on a first change log, a second change log, and another change log, wherein said first change log indicates changes to said first base table, said second change log indicates changes to said second base table, and said other change log indicates changes to said other base table.

12. The method of claim 11, wherein said other table is said second base table and said other change log is said second change log.

13. A computer-readable medium carrying one or more sequences of instructions for incrementally refreshing a materialized query, wherein execution of the one or more sequences of instructions by one or more processors causes the one or more processors to perform the steps of:
    computing a first set of tuples that identify a first set of changes to apply to a materialized view to incrementally refresh the materialized view;
    wherein the materialized view is defined by a query that references a first base table and one or more other tables that include a second base table;
    wherein the materialized view projects one or more columns of the first base table;
    wherein the step of computing a first set of tuples includes computing a first union between
        an intersection between the query and a first change log that indicates changes to said first base table, and an intersection between the query and a first equijoin based on the first base table and a second change log that indicates changes to said second base table.

14. The computer-readable medium of claim 13, wherein the step of computing a first union includes computing a first union based on an intersection between the query and a second equijoin based on the first base table, the second base table, and a third change log that indicates changes to a third base table from said one or more other tables.

15. The computer-readable medium of claim 13,
wherein the first set of tuples identifies tuples to insert into said materialized view;
wherein the steps further include computing a second set of tuples that identifies tuples to delete from said materialized view;
wherein the step of computing a second set of tuples includes computing a second union between
a difference between the query and a third change log that indicates deletions to said first base table, and
a difference between the query and a third equijoin based on the first base table, and a fourth change log base table that indicates deletions to said second base table.

16. The computer-readable medium of claim 13, wherein the query specifies equijoin conditions that define a many-to-one relationship between the first base table and the second base table.

17. The computer-readable medium of claim 13, wherein the query specifies equijoin conditions that define a many-to-many relationship between the first base table and the second base table.

18. The computer-readable medium of claim 13, wherein the materialized view projects only columns from said first base table.

19. The computer-readable medium of claim 13, wherein the query returns only tuples with no duplicate tuples.

20. A computer-readable medium carrying one or more sequences of instructions for incrementally refreshing a materialized query, wherein execution of the one or more sequences of instructions by one or more processors causes the one or more processors to perform the steps of:
storing a materialized view, wherein said materialized view is defined by a query that:
references a first base table and a second base table,
defines an equijoin between said first base table and said second base table based on equijoin conditions that define either a one-to-many relationship or a many-to-many relationship between said first base table and said second base table, and
incrementally refreshing said materialized view based on a first change log and a second change log, wherein said first change log indicates changes to said first base table and said second change log indicates changes to said second base table.

21. The computer-readable medium of claim 20, wherein said query projects columns from only said first base table.

22. The computer-readable medium of claim 21, wherein said query returns only tuples with no duplicate tuples.

23. A computer-readable medium carrying one or more sequences of instructions for incrementally refreshing a materialized query, wherein execution of the one or more sequences of instructions by one or more processors causes the one or more processors to perform the steps of:
storing a materialized view, wherein said materialized view is defined by a query that defines a union between:
a first equijoin between a first base table and a second base table, and
a second equijoin between said first base table and another table;
wherein said materialized view projects one or more columns of said first base table; and
incrementally refreshing said materialized view based on a first change log, a second change log, and another change log, wherein said first change log indicates changes to said first base table, said second change log indicates changes to said second base table, and said other change log indicates changes to said other base table.

24. The computer-readable media of claim 23, wherein said other table is said second base table and said other change log is said second change log.

* * * * *